(12) United States Patent
Knezevic et al.

(10) Patent No.: US 10,097,593 B2
(45) Date of Patent: Oct. 9, 2018

(54) METHOD AND SYSTEM FOR UNIVERSAL CHAT GATEWAYS

(71) Applicant: Tionesta, LLC, San Antonio, TX (US)

(72) Inventors: Ivan Knezevic, Santiago (CL); Paul Posner, San Antonio, TX (US)

(73) Assignee: TIONESTA, LLC, San Antonio, TX (US)

( * ) Notice: Subject to any disclaimer, the term of this patent is extended or adjusted under 35 U.S.C. 154(b) by 0 days.

(21) Appl. No.: 14/548,214

(22) Filed: Nov. 19, 2014

(65) Prior Publication Data
US 2018/0262536 A1    Sep. 13, 2018

Related U.S. Application Data

(60) Provisional application No. 61/906,225, filed on Nov. 19, 2013, provisional application No. 61/908,206, filed on Nov. 25, 2013.

(51) Int. Cl.
H04L 12/66    (2006.01)
H04L 29/06    (2006.01)
H04W 36/22    (2009.01)
H04W 88/16    (2009.01)

(52) U.S. Cl.
CPC ......... *H04L 65/1069* (2013.01); *H04W 36/22* (2013.01); *H04W 88/16* (2013.01)

(58) Field of Classification Search
None
See application file for complete search history.

(56) References Cited

U.S. PATENT DOCUMENTS

| 6,985,748 | B2 | 1/2006 | Knotts |
| 6,996,520 | B2 | 2/2006 | Levin |
| 7,366,795 | B2 | 4/2008 | Rivera |
| 7,379,436 | B2 | 5/2008 | Jiang |
| 7,720,082 | B2 | 5/2010 | Fridman et al. |
| 7,870,211 | B2 | 1/2011 | Pascal et al. |
| 8,223,717 | B2 | 7/2012 | Dillon et al. |
| 8,467,789 | B2 | 6/2013 | Ganesan |
| 2001/0042095 | A1 | 11/2001 | Kim et al. |

(Continued)

FOREIGN PATENT DOCUMENTS

| CN | 202190407 U | 4/2012 |
| KR | 20130073320 | 7/2013 |
| WO | 2012155298 A1 | 11/2012 |

OTHER PUBLICATIONS

Extended European Search Report issued in corresponding European Patent Application No. EP 14864822, dated May 30, 2017 (14 pages).

(Continued)

*Primary Examiner* — Alex Skripnikov
(74) *Attorney, Agent, or Firm* — Osha Liang LLP

(57) ABSTRACT

The innovations of the present invention provide methods and systems for providing seamless access to Communication Methods, systems, and services across multiple networks to and from wherever the cellular devices might be located at the time of transmission. The main advantage of the invention is implementation of a Chat Client that integrates with a mobile device and connects with a Chat Gateway. The Chat Gateway then handles all the routing and the Communication Methods and determines the best way to send and receive messages.

7 Claims, 6 Drawing Sheets

(56) References Cited

U.S. PATENT DOCUMENTS

| | | | |
|---|---|---|---|
| 2003/0129991 A1* | 7/2003 | Allison et al. | 455/456 |
| 2004/0098497 A1* | 5/2004 | Banet et al. | 709/230 |
| 2007/0198368 A1* | 8/2007 | Kannan et al. | 705/26 |
| 2007/0245353 A1* | 10/2007 | Ben-Dor | 719/318 |
| 2013/0073636 A1 | 3/2013 | Zhu et al. | |

OTHER PUBLICATIONS

"Universal Mobile Telecommunications System (UMTS); LTE; Support of Short Message Service (SMS) over generic 3GPP Internet Protocol (IP) access; Stage 2 (3GPP TS 23.204 version 11.5.0 Release 11)", Technical Specification, European Telecommunications Standards Institute (ETSI), 650, Route Des Lucioles; F-06921 Sophia-Antipolis; France; vol. 3GPP SA 2, No. V11.5.0, Sep. 1, 2013 (Sep. 1, 2013), XP014157490 (57 pages).

\* cited by examiner

METHOD AND SYSTEM FOR UNIVERSAL CHAT GATEWAYS

CLAIM OF PRIORITY TO PRIOR APPLICATION

This application claims the benefit of the filing date of U.S. Provisional Application Ser. No. 61/906,225, filed on Nov. 19, 2013, entitled "Method and System for Universal Chat Gateways" and U.S. Provisional Application Ser. No. 61/908,206, filed on Nov. 25, 2013, entitled "Method and System for Universal Chat Gateways", the entire disclosures of which are hereby incorporated by reference into the present disclosure.

BACKGROUND OF THE INVENTION

1. Field of the Invention

The present invention relates to methods and systems for providing alternate communication pathways for mobile devices, specifically, video, voice, text, or picture data over mobile telecommunication handsets. The invention presents improvements for communicating information across multiple networks through use of both Internet Protocol (IP) and roaming transmissions.

2. Description of Related Art

Mobile devices have evolved from a simple voice communication medium to becoming a multi-function communication device. Today, mobile device users can communicate via video, video memo, voice, voice memo, text, Short Message Service (SMS), Multimedia Messaging Service (MMS), instant message, picture message, Facebook chat, Internet Relay Chat (IRC), other chat programs, in addition to a wide variety of alternative communications means, all from our mobile devices ("Communication Methods"). Users of modern mobile devices face juggling the multiple applications, programs, usernames, logins, passwords, friend's lists, and other items just to navigate the communications options of their mobile devices. Further, for many mobile users, the Communication Methods present multiple contact lists and user interfaces that are often not very consistent with each other.

Mobile devices can use internet protocol services and cellular telecommunication services for communicating video, voice, data, text, and picture information when the corresponding networks are accessible. Internet protocol networks are easy enough for data driven mobile device applications to implement. However, use of cellular radio networks generally require access to licensed RF spectrum, either via a user's home network provider or via a web of partnerships with roaming network providers, either of which usually incurs an expense for the user and can be a challenge for application developers to utilize. Together the mix of IP and cellular communication networks is referred to as "Communication Networks." Furthermore, most application developers do not have the hardware to interface with the Cellular Networks, thus their applications are limited to accessing the Communication Networks via the standard methods available on the mobile device. Managing and navigating the multiple types of Communication Methods become that much more complex when we factor in the different Communication Networks.

Therefore, and for many other reasons as may be known to those of ordinary skill in the art, there is a long-felt unresolved need in the art for better systems and methods for providing seamless access to Communication Methods, systems, and services across multiple networks to and from wherever the cellular devices might be located at the time of transmission. Many other prior problems, limitations, obstacles and deficiencies (collectively, "challenges") will be generally known to those of skill in the art and will otherwise be evident from the following descriptions as well as from thoughtful consideration of any claims that may be added or appended hereto or to an application claiming priority hereto.

SUMMARY OF THE INVENTION

The innovations of the present invention provide methods and systems for providing seamless access to Communication Methods, systems, and services across multiple networks to and from wherever the cellular devices might be located at the time of transmission. The main advantage of the present invention is implementation of a Chat Client that integrates with a mobile device and connects with a Chat Gateway. The Chat Gateway then handles all the routing and the Communication Methods and determines the best way to send and receive messages. The Chat Gateway has access to a Cell Gateway which allows backend access to the Cellular Network without relying on the mobile device. The Cell Gateway is hardware and software that allows the Chat Gateway to act as a roaming provider for users registered on the Chat Gateway.

The present invention has the advantage of providing a seamless user experience. The mobile device user does not need to determine if another user is registered on the same Communications Network. Mobile device users do not need to manage multiple contact lists and various communications services. With the present invention the messages are seamlessly routed via the Chat Gateway or traditional cellular networks via the Cell Gateway as is required to deliver the communications. Further advantages include improved and expanded Communication Methods such as video, video memos, voice, voice memos, text, picture, voicemail, and other methods as described in some embodiments of the present invention.

Many other objects, features, advantages, benefits, improvements and non-obvious unique aspects of the present invention, as well as the prior problems, obstacles, limitations and challenges that are addressed, will be evident to the reader who is skilled in the art, particularly when this application is considered in light of the prior art. It is intended that such objects, features, advantages, benefits, improvements and non-obvious unique aspects are within the scope of the present invention, the scope of which is limited only by the claims of this and any related patent applications and any amendments thereto.

To accomplish all the above, it should be recognized that this invention may be embodied in the form illustrated in the accompanying drawings, attention being called to the fact, however, that the drawings are illustrative only, and that changes may be made in the specifics illustrated or described.

BRIEF DESCRIPTION OF THE DRAWINGS

A better understanding of the present invention may be had from the drawings as described in greater detail in the DETAILED DESCRIPTION OF PREFERRED EMBODIMENT section which follows.

DETAILED DESCRIPTION OF PREFERRED EMBODIMENT

Figure 1:
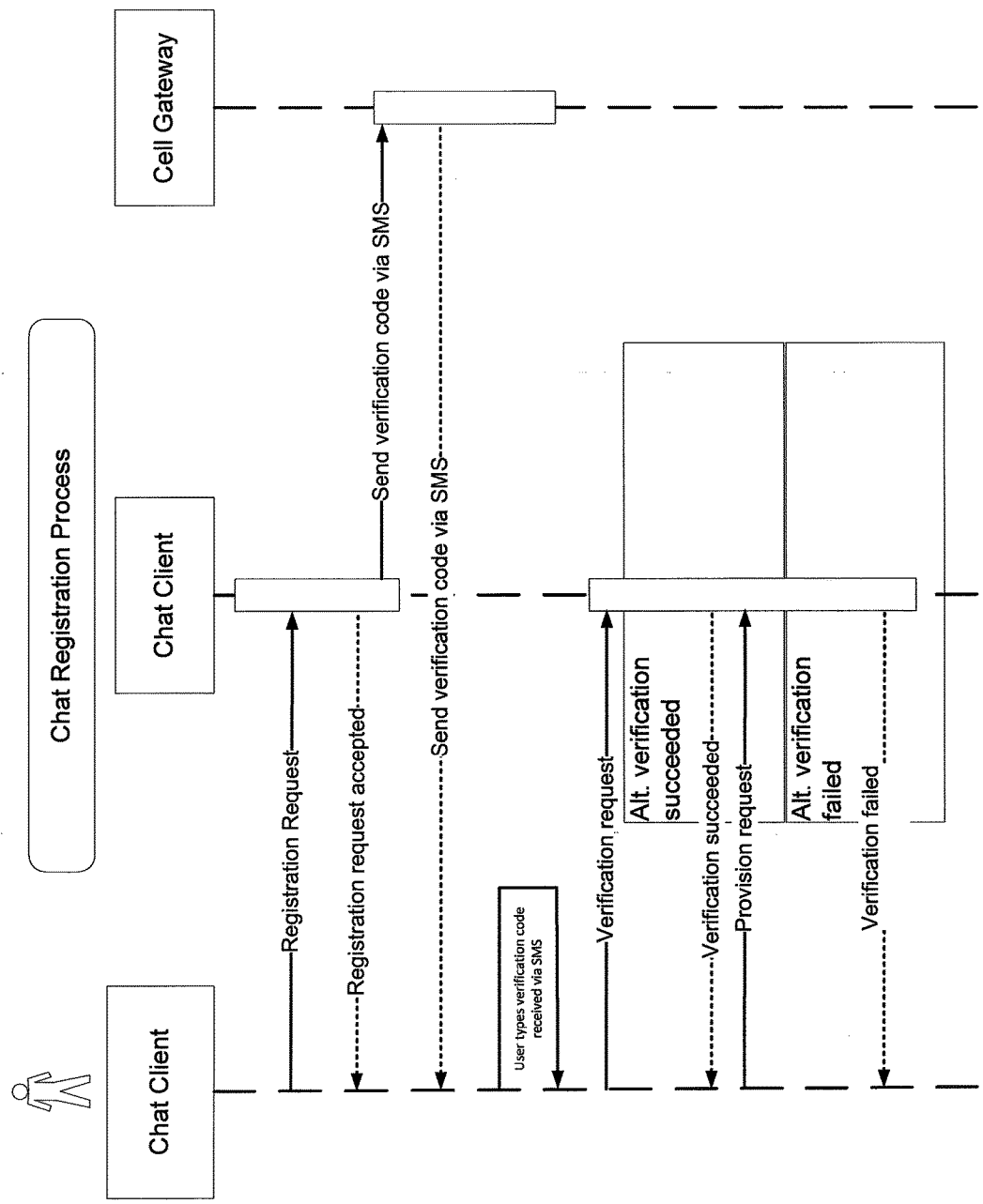
FIG. 1 is a chart of the Chat Registration process of the present invention.

The following is a description of the present invention. In general the major components of the present invention are the Chat Client, the Chat Gateway, and the Cell Gateway. In these descriptions, the term "client" includes (but is not be limited to) users, customers, and consumers. "Client" should also be understood to refer to any person or organization with an interest in communicating wirelessly to another person or organization. The term "mobile device" or the like should generally be understood to include (without limitation) mobile devices, cellphones, smartphones, wireless phones, and other wireless devices, to the extent that such devices would fall within the scope of any patent claims that may ultimately issue based on these descriptions.

In the preferred embodiment the Chat Client is an application that runs on a mobile device. The Chat Client integrates into the mobile device operating system and replaces the Communication Methods of the device. In the preferred embodiment, the Chat Client automatically imports all the text, SMS, MMS, and contact lists of the mobile device. In alternative embodiments, the Chat Client will provide multiple Communication Methods, such as video chat, video memo, voice chat, voice memo, text, picture messaging, group chat, location sharing, file transfer, among others. In other embodiments, the Chat Client will optionally run in addition to the standard applications included (embedded) on the users' mobile device. The Chat Client manages sending and reception of communications from the users' mobile device. To a user, the Chat Client keeps all the functionality normally available over their cellular home service network. This has the advantage of providing a single interface to manage all communications with other users.

The Chat Client has several innovations in the user interface. For example, the Chat Client interface in some embodiments allows for a one button toggle for voice memos and voice communications. In some embodiments this one button toggle could be similar to a "walkie talkie" or "push to talk" type communication. In other embodiments this feature is used to append or attach voice, video, or picture messages to a text conversation. In some embodiments the Chat Client features VOIP or SIP voice communication.

The Chat Gateway acts as the primary communications gateway for the Chat Client. The Chat Client generally connects to the Chat Gateway via a data connection. In the preferred embodiment, this is via WiFi or cellular data connection. The Chat Gateway manages and negotiates the Communications Methods and ensures that all communications are routed according to the preferred method. For example, in the case that Chat Client A and Chat Client B are both registered on the Chat Gateway, communications are routed through the Chat Gateway. In this embodiment, these communications bypass the normal cellular communications network and use data connections. In cases where Chat Client A is registered on the Chat Gateway and Chat Client B is not, the Chat Gateway routes the communications via the Cell Gateway.

The Cell Gateway acts as the interface between the Chat Gateway and general cellular network. In the preferred embodiment, the Cell Gateway is hardware and software that allows the Chat Gateway to act as a roaming provider for users registered on the Chat Gateway. When a Chat Client connects to the Chat Gateway, the Cell Gateway updates the home carrier's Visitor Location Register (VLR) of the cellular carrier. This sets the particular Chat Client as roaming on the home provider cellular carrier of the user. The cellular carrier then routes all communications to the Chat Client through the Cell Gateway and the Chat Gateway. This allows other users to reach the Chat Client user via their standard methods, while allowing the Chat Gateway to manage communications.

In one alternative the Cell Gateway converts the communications to a communication format compatible with the normal mobile phone network. For example, if the Chat Client sends a text message in a non-standard or incompatible cellular format, the Cell Gateway will convert the text message to SMS or another compatible format for distribution on the cellular network. In other alternatives, the Cell Gateway immediately updates the VLR in real time rather than using batch updates as is known in the art. In some embodiments the conversion of messaging formats is managed by the Chat Gateway.

FIG. 1 depicts the Chat Registration Process of the current invention. The Chat Client is installed on a mobile device. The Chat Client sends a registration request to the Chat Gateway via a data connection in the preferred embodiment. The Chat Gateway processes the registration request and returns a "registration request accepted" acknowledgement to the Chat Client. The Chat Gateway sends to the Chat Client a verification code via the Cell Gateway and the normal SMS/MMS network. The verification code ensures that the mobile device used to connect to the Chat Gateway is not spoofed. The user then enters the received verification code using the Chat Client.

After the verification code has been entered, the Chat Client sends a verification request to the Chat Gateway. The Chat Gateway returns a "verification succeeded" acknowledgment, and the Chat Client is provisioned on to the Chat Gateway network. If the verification failed, the Chat Gateway returns a "verification failed" acknowledgement and, in the preferred embodiment, the "send verification code" process begins again.

In the preferred embodiment, once the Chat Client has successfully been provisioned on the Chat Gateway, the Chat Gateway preferentially sets all normal cellular communications to be routed via the Chat Gateway if possible. In this embodiment, the mobile device is set as roaming on the cellular network and all voice, text, and data is sent via the Chat Gateway. In alternative embodiments, various levels of roaming may be set. For example, in some embodiments, voice message could be routed via the standard cellular network while text would be routed via the Chat Gateway.

Figure 2:
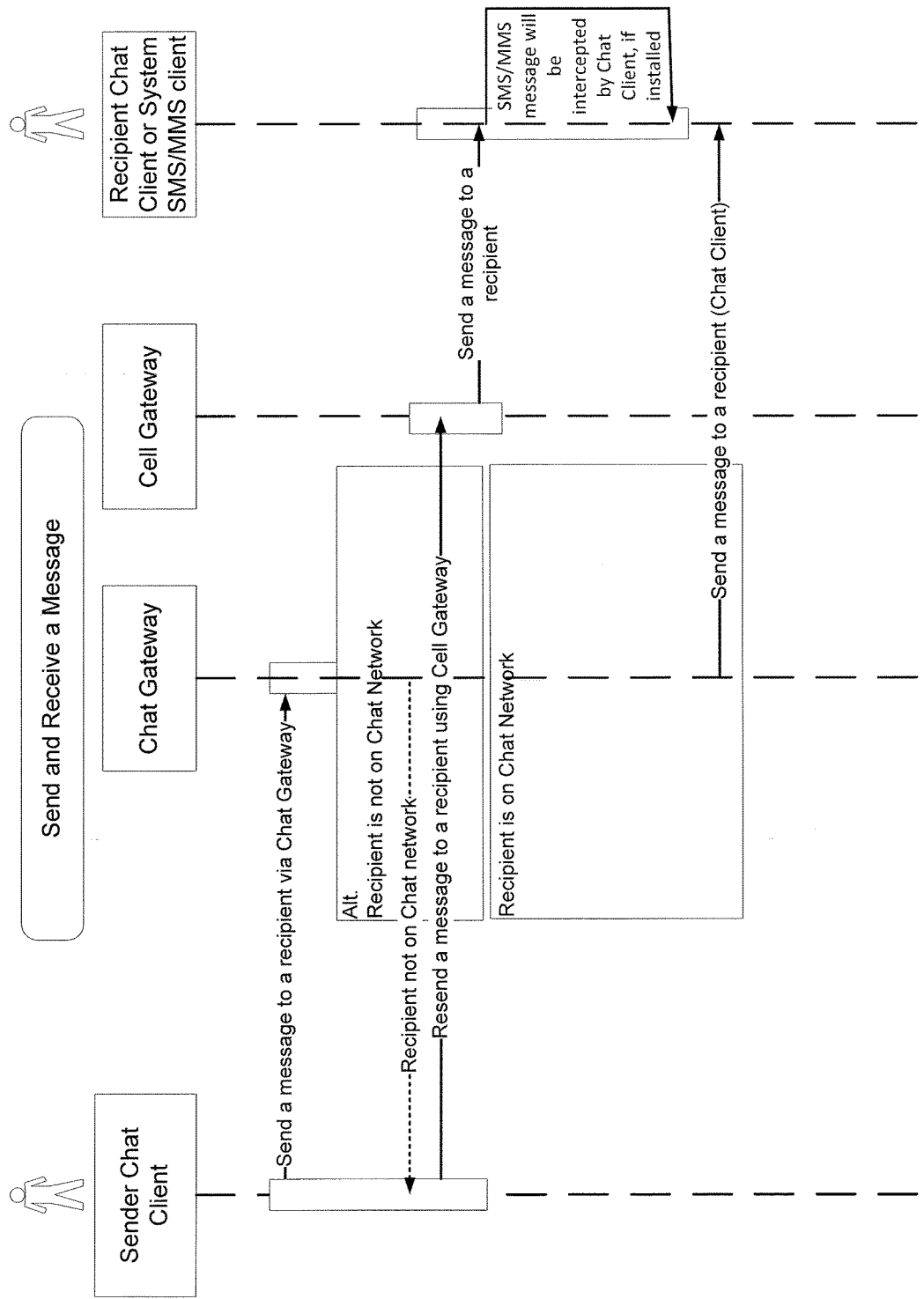
FIG. 2 is a chart of the Send and Receive a Message process of the present invention.

FIG. 2 shows the Send and Receive Message process of the present invention. The sender Chat Client sends the message to the Chat Gateway. If the recipient Chat Client is also registered on the Chat Gateway, then the Chat Gateway sends the message to the recipient Chat Client. If the recipient Chat Client is not registered on the Chat Gateway, the Chat Gateway sends a recipient "not on chat network" acknowledgment to the sender Chat Client. The sender Chat Client then resends the message via the Cell Gateway. In some embodiments, the Chat Gateway sends the message to the Cell Gateway itself. The Cell Gateway sends the message to the recipient Chat Client. It should be noted that in this document, the recipient Chat Client could be a Chat Client as presented in this invention, in which case, in the preferred embodiment, the message is intercepted by the Chat Client and presented to the mobile device user. In addition, the recipient Chat Client could also be a system SMS/MMS client, in which case the message is received by the system mobile device and presented to the user.

The advantage of using the Chat Gateway is that the sending and the receiving Chat Clients can avoid texting charges and other network fees. Both clients also can enjoy greater Communication Methods than is available via standard cellular communications, for example, video, voice, and picture messages, among others as mentioned above. In some embodiments the Chat Client automatically indicates which Communications Methods are available with a particular recipient and indicates this on the interface of the Chat Client. Another advantage of the present invention is that the mobile device user can send messages without concern as to whether the recipient Chat Client is registered on the Chat Network. The invention negotiates and routes the messages to the recipient through standard cellular methods without any active involvement of the user of the sender Chat Client.

Figure 3:
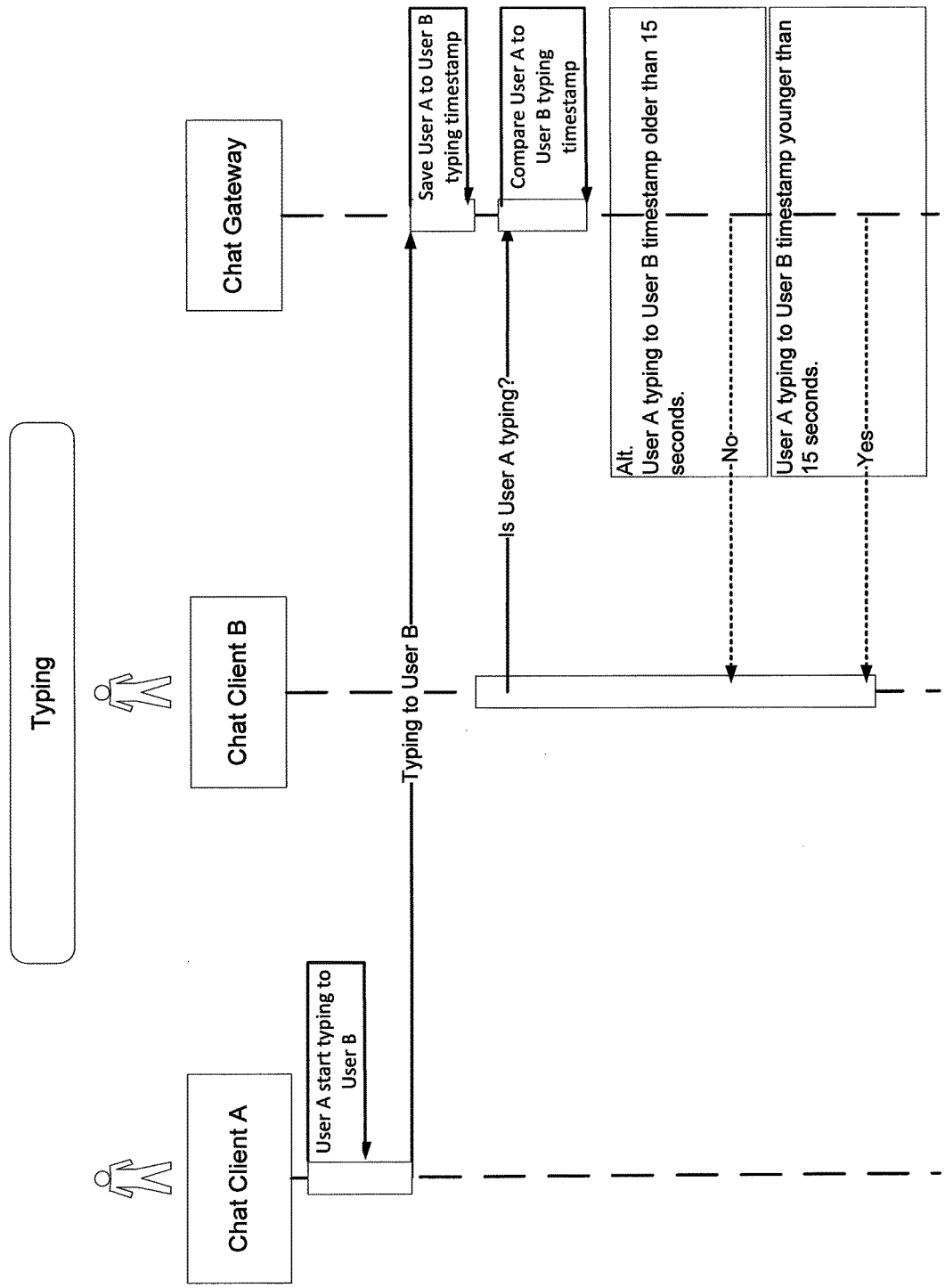
FIG. 3 is a chart of the Typing Indication process of the present invention.

FIG. 3 shows the Typing Indication process of the present invention. It should be noted that this process can extend to multiple Chat Client recipients in some embodiments. In this figure, User A of Chat Client A starts typing to User B of Chat Client B. Chat Client A sends an indication that User A is typing to the Chat Gateway. The Chat Gateway saves the User A to User B typing timestamp. Chat Client B queries the Chat Gateway whether User A is typing. The Chat Gateway compares the timestamp of the last User A to User B typing timestamp. If the User A typing to User B timestamp is older than 15 seconds, the Chat Gateway returns a "No" to Chat Client B. If the User A typing to User B timestamp is younger than 16 seconds, the Chat Gateway returns a "Yes" to Chat Client B. Alternative embodiments might use a different number of seconds for the User A typing to User B age. In some embodiments the calculation of the timestamp is done on the Chat Client.

Figure 4:
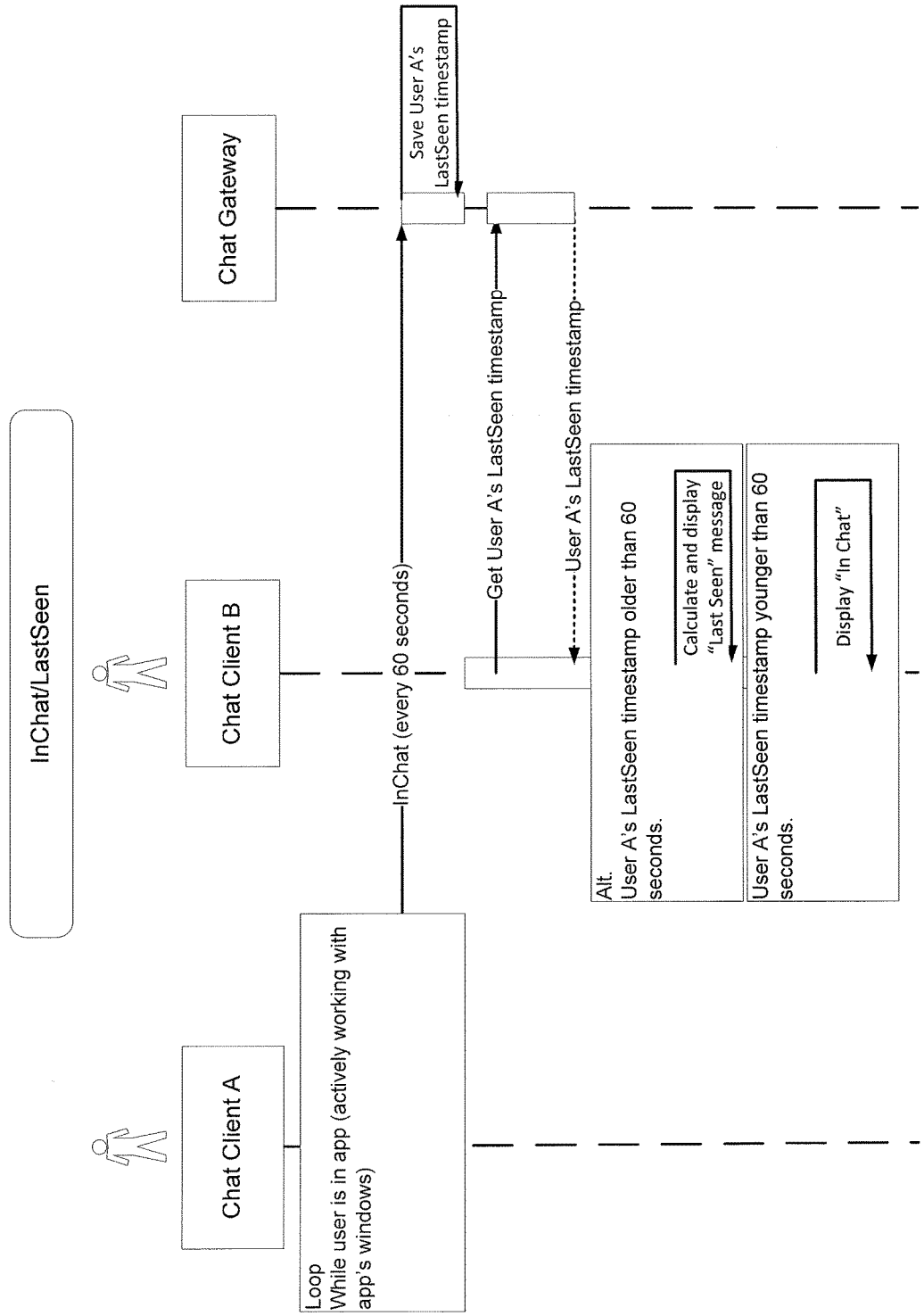
FIG. 4 is a chart of the InChat/LastSeen process of the present invention.

FIG. 4 shows the InChat/LastSeen process of the present invention. It should be noted that this process can extend to multiple Chat Client recipients in some embodiments. Chat Client A runs a loop while the user is actively using the Chat Client. Every 60 seconds the Chat Client sends an "In Chat" indicator to the Chat Gateway. The Chat Gateway notes the time of the received "In Chat" indicator and saves that as User A's "Last Seen" timestamp. Chat Client B sends a query to the Chat Gateway to Get User A's "Last Seen" timestamp. The Chat Gateway responds with the most recent User A's "Last Seen" timestamp. If the User A's "Last Seen" is older than 60 seconds, the Chat Client B calculates and displays a "Last Seen" message. If the User A's "Last Seen" is younger than 61 seconds, the Chat Client B displays an "In Chat" message. Alternative embodiments might use a different number of seconds for the timestamp calculations. In some embodiments the calculation of the timestamp is done on the Chat Gateway.

Figure 5:
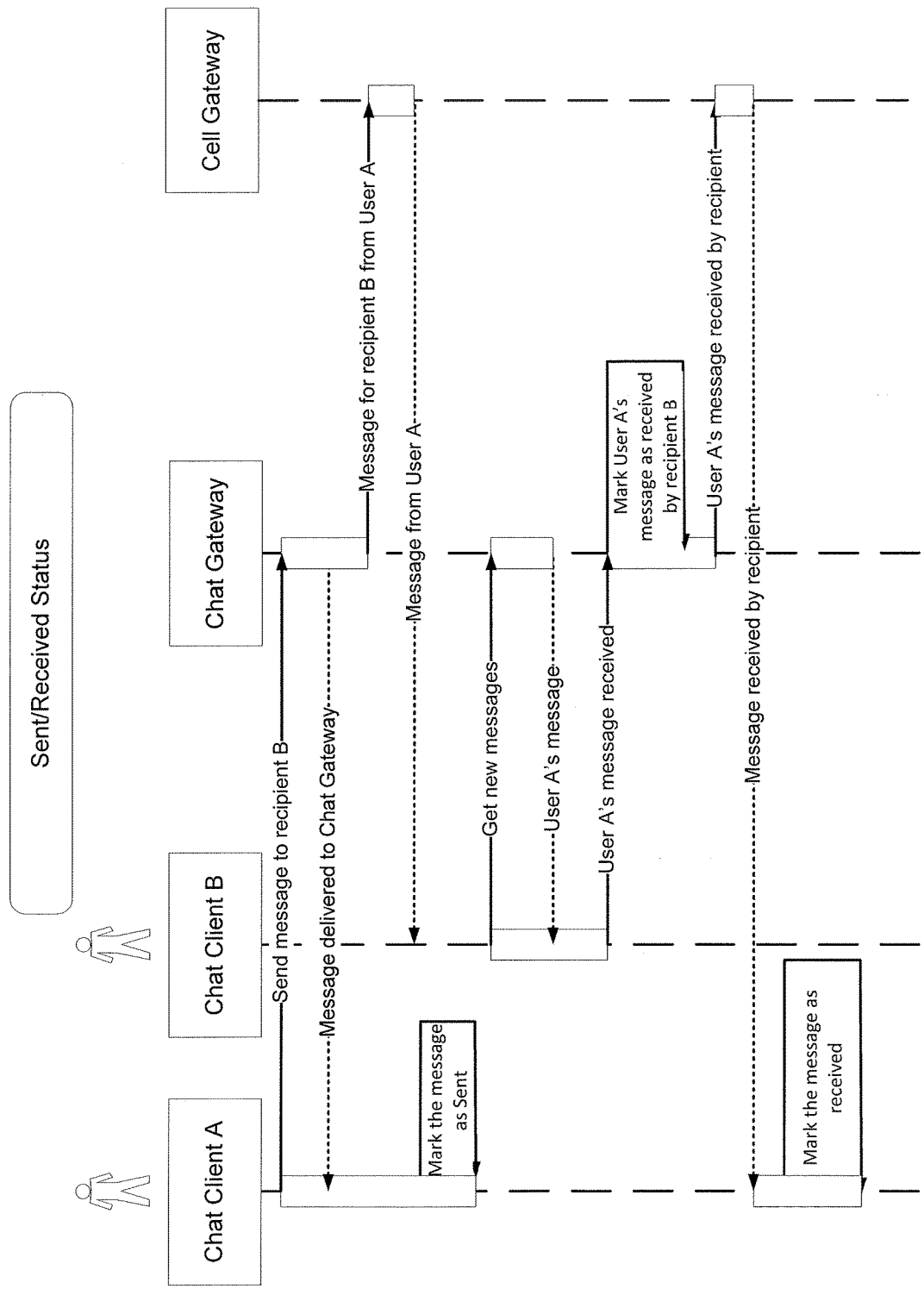
FIG. 5 is a chart of the Send/Receive process of the present invention.

FIG. 5 describes the Sent/Received process of the present invention. It should be noted that this process can extend to multiple Chat Client recipients in some embodiments. Chat Client A sends a message to recipient B via the Chat Gateway as described above. The Chat Gateway sends a "Message Delivered" to the Chat Gateway indicator to Chat Client A whereupon Chat Client A marks the message as "Sent". The Send Message process continues as described above. If the message is sent via the Chat Network and the Chat Gateway, when Chat Client B gets new messages from the Chat Gateway, it receives User A's message and a User A's "message received" acknowledgement to the Chat Gateway. The Chat Gateway marks User A's message as received by recipient B and then sends a "message received by recipient" acknowledgement to Chat Client A. Chat Client A marks the message as received. If the message is sent via the Cell Gateway, a similar process is followed to mark the message as received.

Figure 6:
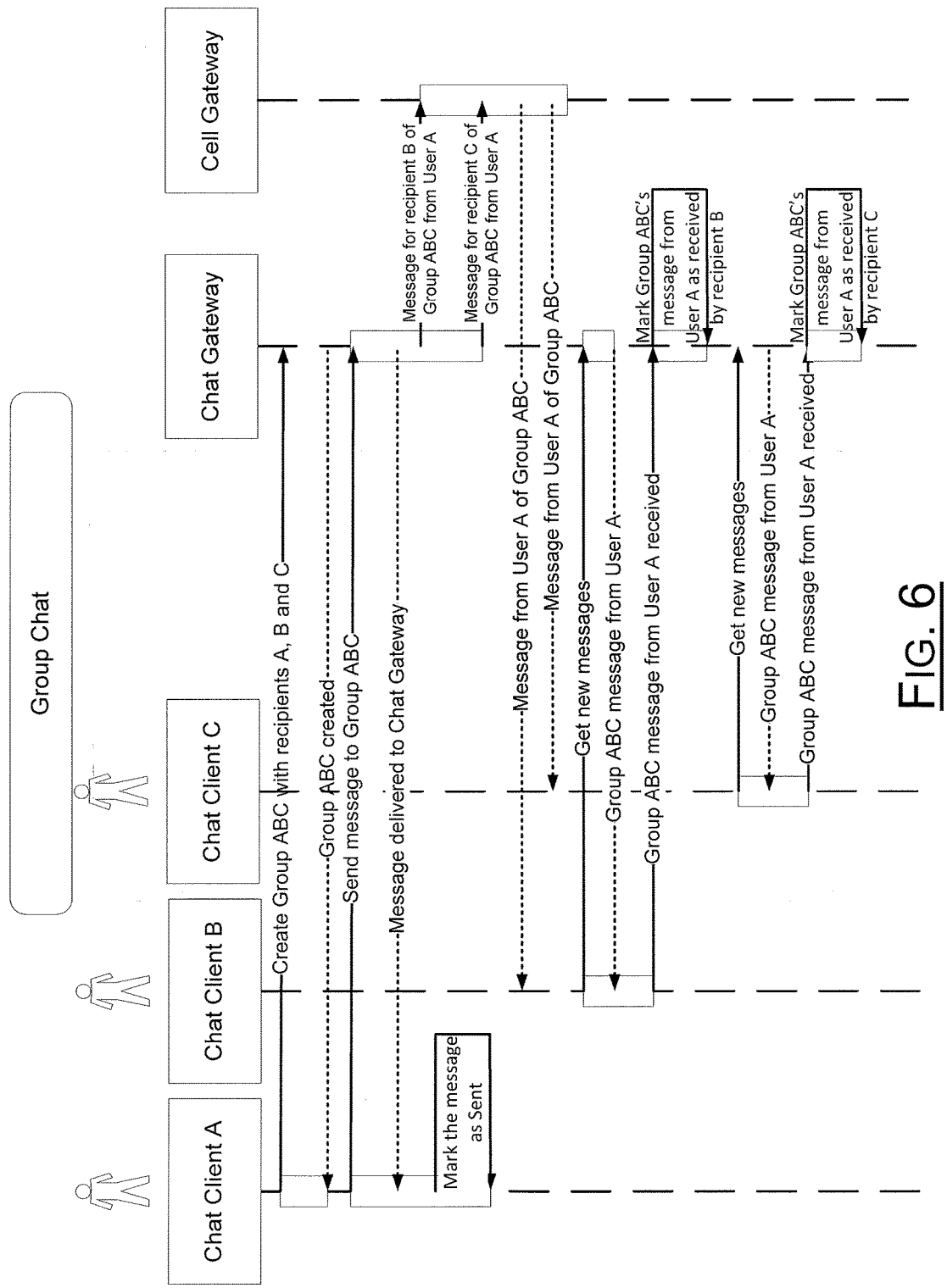
FIG. 6 is a chart of the Group Chat process of the present invention.

FIG. 6 describes an implementation of a Group Chat process of the present invention. Chat Client A creates the chat Group ABC with recipients A, B, and C. The Chat Gateway acknowledges the creation of the chat Group ABC. The Chat Gateway negotiates the routing of the group messages to the proper recipient and uses the proper method. For example, in FIG. 6, Chat Client B is not registered on the Chat Network and all messages to and from Chat Client B are routed via the Cell Gateway. Chat Client C, in contrast, is registered on the Chat Network and all messages are routed via the Chat Gateway. FIG. 6 depicts the various timestamps and processes described more fully above in the Group Chat context.

In some embodiments of the present invention, the methods and systems described are provided via computer software, either via the internet, via a stand-alone software application operating independently or in connection with other software systems, or some combination of the two. As well, embodiments may come in any known form and may also be implemented by hardware; software, scripting languages, firmware, middleware, microcode, hardware description languages, and/or any combination thereof.

With reference again to the figures, it should be understood that the graphical representation of the system is an exemplary reference to any number of software and business systems that may be implemented by the present invention, whether through the web or as standalone executable.

Specific details are given in the above description to provide a thorough understanding of various preferred embodiments. However, it is understood that these and other embodiments may be practiced without these specific details. For example, processes may be shown in diagrams in order not to obscure the embodiments in unnecessary detail. In other instances, well-known processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have many additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

While the principles of the disclosure have been described above in connection with specific methods, it is to be clearly understood that this description is made only by way of example and not as limitation on the scope of the disclosure. Whether now known or later discovered, there are countless other alternatives, variations and modifications of the many features of the various described and illustrated embodiments, both in the process and in the system characteristics, that will be evident to those of skill in the art after careful and discerning review of the foregoing descriptions, particularly if they are also able to review all of the various systems and methods that have been tried in the public domain or otherwise described in the prior art. All such alternatives, variations and modifications are contemplated to fall within the scope of the present invention.

Although the present invention has been described in terms of the foregoing preferred and alternative embodiments, these descriptions and embodiments have been provided by way of explanation of examples only, in order to facilitate understanding of the present invention. As such, the descriptions and embodiments are not to be construed as limiting the present invention, the scope of which is limited only by the claims of this and any related patent applications and any amendments thereto.

The invention claimed is:

1. A mobile device implemented system for providing seamless access to communication services across multiple networks to and from wherever mobile devices might be located at the time of transmission, said system comprising:
   a cellular gateway;
   a mobile device; and
   a chat gateway that is distinct and independent from the mobile device,
   wherein said cellular gateway is connected between the chat gateway and a general cellular network actively updating a user's Visitor Location Register (VLR) in real time, and
   wherein said chat gateway and said cellular gateway are programmed to perform a method including the steps of:
      said chat gateway registering as online with said cellular gateway;
      said cellular gateway updating a cellular carrier Home Location Register (HLG) for said user, setting said user as roaming with routing information of said cellular gateway as said user's VLR;
      said cellular gateway routing all standard cellular traffic to and from the general cellular network via said chat gateway;
      said chat gateway managing said communication services and ensuring that all communications are routed via a communication protocol that is determined by said chat gateway independent of a selection by said user;
      said chat gateway including a user interface that allows for said user to toggle between preferred communication protocols; and
      wherein said user interface allows said user to review and reconfigure said method.

2. The system of claim 1, wherein said chat gateway is an application that runs on a mobile device.

3. The system of claim 1, wherein said chat gateway is a web application that runs on a computing device.

4. The system of claim 1, wherein said preferred communication protocols include at least one selected from a group consisting of: Voice Over Internet Protocol (VOIP), Short Message Service (SMS), Multimedia Messaging Services (MMS), Voice memo, and Push to Talk (PTT).

5. The system of claim 1, wherein said communication services include at least one selected from a group consisting of: cellular voice, cellular data, and WiFi data.

6. The system of claim 1, wherein the chat gateway sends a verification communication to the user to ensure that the mobile device used to connect to the chat gateway is not spoofed.

7. The system of claim 1, wherein
   the mobile device allows the user to communicate to a non-registered recipient and
   the mobile device routes the communication services to the non-registered recipient through standard cellular methods without any active involvement from the user.

* * * * *